United States Patent [19]

Kodys

[11] 3,884,561
[45] May 20, 1975

[54] LENS HOLDING GROOVE MEANS
[75] Inventor: Edmund Kodys, Westminister, Mass.
[73] Assignee: Foster Grant Co., Inc., Leominster, Mass.
[22] Filed: Jan. 30, 1974
[21] Appl. No.: 438,103

[52] U.S. Cl. .................. 351/83; 351/86; 351/154
[51] Int. Cl. ............................................. G02c 5/00
[58] Field of Search .......... 351/83, 86, 154; 2/14 D, 2/14 E

[56] References Cited
UNITED STATES PATENTS
1,520,977  12/1924  Stevens ................................ 351/86
2,773,260  12/1956  Hirschmann ........................ 2/14 D Primary Examiner—Paul A. Sacher
Attorney, Agent, or Firm—Leonard S. Selman

[57] ABSTRACT

An improved groove means for holding substantially flexible convex lenses in the lens openings of the frame portion of a pair of spectacles, especially of the sunglass type.

3 Claims, 4 Drawing Figures

LENS HOLDING GROOVE MEANS

BACKGROUND AND OBJECTS OF THE INVENTION

This invention relates to the mounting of lenses into frame portions of a pair of spectacles. The spectacles may be of the sunglass type and the lenses are of the type that are substantially flexible such as the well known thin plastic polarizer lenses or thin sheet acetate lenses, for example. The invention is specifically concerned with such lenses which have a convex curvature so that the center of each lens is displaced forwardly from the peripheral edge of the lens which is held in the lens openings of the frame portion.

In utilizing such lenses it is necessary to devise methods of easily mounting such lens in the appropriate lens openings during assembly in the manufacturing plant and it is also necessary to prevent the lenses from accidently popping out of the openings when in the hands of the user. To accomplish this it has been common practice to provide a groove in the front frame portion surrounding each of the lens openings into which the edges of the flexible lenses may be snapped. The groove should desirably be of the same size and peripheral configuration of the lens so as to avoid too tight a fit about the lens periphery causing the lens to flex and distort or too loose a fit which allows it to move around in the groove. In using the standard groove structure with these flexible lenses serious problems were encountered. Using groove depths which were known to hold more rigid lenses resulted in lenses popping out too easily causing complaints by users and when deeper groove depths were tried serious manufacturing difficulties were encountered. Lenses which would fit properly in these deeper grooves when snapped into place had to be of a size such that it was very difficult to flex the lens enough to force the edge of the lens over the portions of the frames bordering the lens receiving grooves. So much interference was encountered that many assemblers especially women found it beyond their manual strength to insert such lenses. The problem was further aggravated when the front frames were of a substantially rigid metal material rather than the somewhat more flexible synthetic plastic frames.

Thus it became an object of the invention disclosed herein to provide a much improved groove structure for both plastic and metal frames to hold these flexible lenses in a manner to prevent their accidental removal from the lens receiving groove while still providing for relatively easy insertion of the lenses into the lens receiving grooves during the assembly operation.

Another aspect of this invention relates to the role of the groove structure in receiving lenses having various geometrical configurations. It has been found that it is difficult with certain lens configurations to exactly match the shape of the lens openings in the front frame portions thereto thus the lens receiving groove configuration of the invention is directed also to avoid the showing of any air gaps between the edge of the lens and the frame.

SUMMARY OF THE INVENTION

The foregoing objects of the invention are accomplished by a small but critical change in the lens receiving groove configuration. The groove is formed in the material of the front frame portion surrounding the lens receiving openings. The groove itself is a space which may be machined or molded between what may be referred to a pair of ledge portions on either side thereof. It is thus a feature of the invention to form these ledge portions so that they extend inwardly from the edge of the convex lens mounted therein substantially different distances from the edge of the lens in a manner resulting in substantial functional advantages. Specifically the front ledge portion which is outwardly of the front surface of the convex lens extends inwardly of the edge of the lens a distance which is a substantial multiple of the distance that the rear ledge portion extends inwardly from the edge of the lens mounted in the groove. Thus the lens which is always inserted from the rear of the frame portion experiences less interference with the less inwardly extending rear ledge portion bordering the groove and may deform relatively easily enough to allow the edge of the lens to pass over the rear ledge portion and released so that it fits properly in the groove. When using substantially rigid metal frames in accordance with the preferred embodiment of the invention the shorter rear ledge portion is especially critical. This is so since the metal frame will not distort to any degree to allow the lens to be inserted as is the case with a more easily distortable plastic frame for example. Thus the lens must be flexed enough to allow it to be inserted in the groove and the shorter rear ledge portion means the lens does not have to be flexed as much as would be required by a longer ledge thus reducing the manual strength required. Due to the convex curvature of the flexible lens it is found that a force on the front of the lens will not cause the lens to pop out rearwardly from the groove over the foreshortened rear ledge portion but instead the lens will tend to flatten thus enlarging its peripheral size and actually causing it to fit tighter in the groove. The further inwardly extending front ledge portion bordering the groove is of a sufficient length so that even with a substantial force from the rear of the lens it does not deform enough for the edge of the lens to slip over the lengthened front ledge and thus the lens will not pop out forwardly from the groove. The front ledge portion also extends inwardly from the edge of the lens a sufficient distance so as to prevent the showing of any air gap between the lens and the frame front in the event there is a slight mismatch of the lens shape and the shape of the lens receiving opening.

DISCUSSION OF PRIOR ART

Certain prior art has been noted, in particular U.S. Pat. No. 1,520,977 and U.S. Pat. No. 1,520,978 both issued to F. A. Stevens on Dec. 30, 1924. Both these patents are directed toward the insertion of a rigid ophthalmic glass lens into the lens opening of a spectacle frame portion composed of a non-metallic material like celluloid. Because the lenses were not flexible but rigid it had been the practice to use heat to expand or stretch the frame to allow the lens to be seated in the lens grooves surrounding the lens openings. The Stevens patents as an alternative to this practice disclose a mounting for the rigid lens which providing for cutting away all or most of one side or ledge of a lens receiving groove in at least certain areas of the lens receiving openings. To hold the lens in place the rest of the groove Stevens utilized clips which may be integral with the frame to in effect replace the cut away side or ledge of the groove in certain locations around the lens openings. The invention disclosed herein is directed toward a different problem in that it is dealing with flexible convex lenses and the tendency thereof to pop out of a shallow lens receiving groove and resist entry into a deeper groove in a preferably substantially rigid metal frame until the invention disclosed and claimed herein was conceived.

DESCRIPTION OF THE PREFERRED EMBODIMENT

Figure 1:
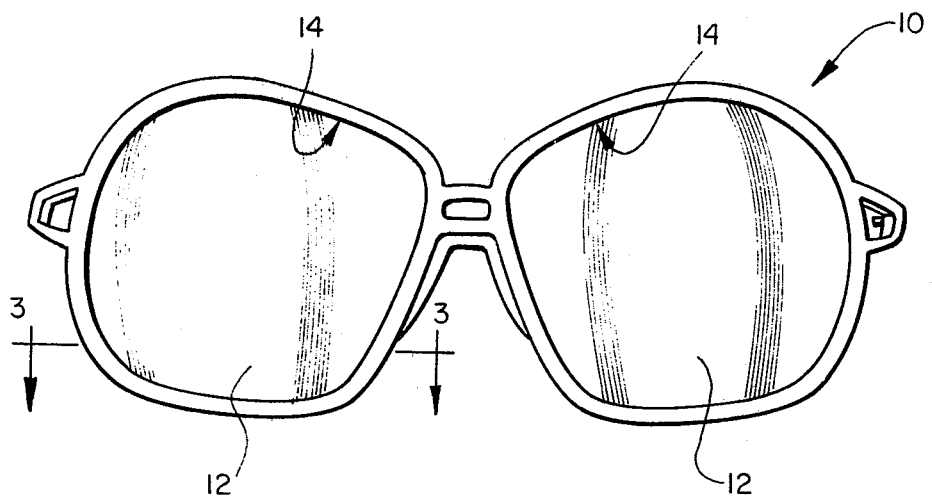
FIG. 1 is a front elevational view of the frame portion of a pair of spectacles having lenses mounted therein.

Referring more particularly to the drawings wherein like reference numerals designate like parts throughout the several views, there is shown in FIG. 1 a frame portion 10 of a pair of spectacles of the sunglass type having a pair of lenses 12 mounted in lens receiving openings 14.

Figure 2:
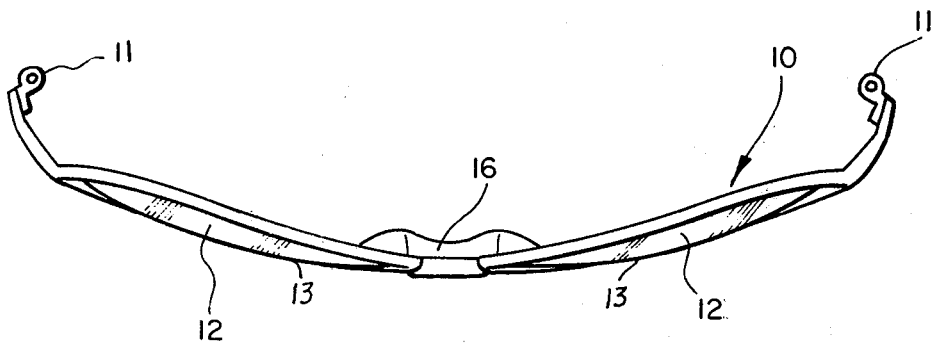
FIG. 2 is a top plan view of the spectacle frame.
Figure 3:
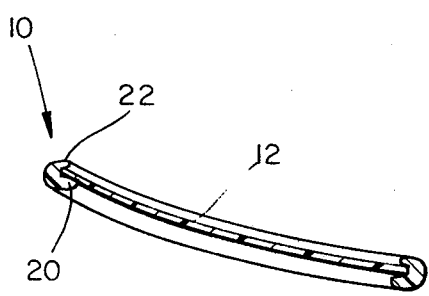
FIG. 3 is a sectional view taken along line 3—3 of FIG. 1.
Figure 4:
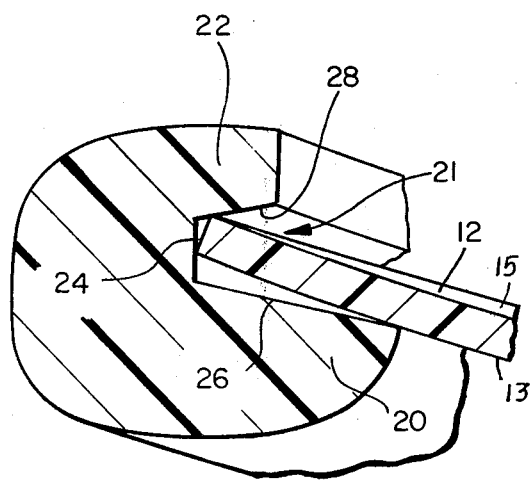
FIG. 4 is an enlarged fragmentary sectional view showing the edge of the lens mounted in the lens receiving groove.

The lenses 12 are of a substantially flexible plastic material having a convex curvature as shown in FIG. 2 and having a front surface 13 and a rear surface 15, as shown in FIG. 4. The convex curvature as shown in FIGS. 2, 3 and 4 is considered to be forwardly extending as the curved center portion of the lens extends forwardly with respect to the frame portion. Hinge elements 11 and a nose piece 16 as shown in FIG. 2 complete the frame portion which is utilized with a pair of temple portions hinged to element 11 as part of the complete spectacle frame.

The frame portion shown in preferably of a metal alloy and is die cast into the configuration shown. This cast metal frame is substantially rigid and may be transformed by various finishing techniques into an extremely attractive metal frame. The frame portions of the invention are not limited, however, to substantially rigid metal frames since the features of the improved lens retaining structure are also of benefit to frames formed of plastic material for example where the same lens popping exist due to the flexibility of the lenses utilized therewith.

The lenses 12 are maintained in the openings 14 with the use of the groove means illustrated in FIGS. 3 and 4. As shown therein, a groove means is provided surrounding each lens opening which comprises a front ledge portion 20 and a rear ledge portion 22 spaced from one another to form a lens receiving groove 21 therebetween. As previously explained the rear ledge portion 22 is considerably shorter than the front ledge portion 20. Thus when the lens 12 is flexed for insertion into the lens opening 14 the outer edge 24 of the lens may be slipped over ledge portion 22 to allow easier insertion into the groove. Once the ledge 22 is cleared the lens 12 is released and its tendency to return to its unflexed or unstressed condition or its "memory" will assure that it remains in the groove 21 with its edge 24 pressed therein. Thus when the lens 12 is mounted in the groove 21 the front ledge portion 20 extends inwardly from the edge of the lens a substantial distance, for example on the order of about 0.050 inches and contacts a curved portion of the front surface of the lens spaced inwardly from the edge thereof. This will insure that the lens under normal conditions such as when being cleaned or when the frames are inadvertently dropped will not be flexed enough to accidently pop out of the groove and further that the entire periphery of the lens is covered from view. The rear ledge portion 22 extends inwardly from the edge of the lens 12 a substantially lesser distance than the front ledge portion for example on the order of about 0.020 inches. The rear ledge portion is positioned to contact at least a portion of the edge of the rear surface 15 of the lens mounted in the groove 14 to aid in maintaining the lens in the groove. The measurements given above, i.e., 0.050 and 0.020 inches, are taken from the deepest part of the groove 21 as shown in FIG. 4 along the lens facing walls 26 and 28 of the front and rear ledge portions respectively. Although the measurements given above are only exemplary, it has been found in practicing the invention that the front ledge portion 22 should extend inwardly from the edge of the lens at least twice the distance of the inward extent of the rear ledge portion from the lens edge as so measured.

It should be understood that the lens holding grooves could conceivably have some slightly altered configuration from that described in the preferred embodiment, such as a V-shaped groove, for example, so long as the relative relationship of the inward extent of the front ledge portions and rear ledge portions is maintained.

The groove structure may be case or molded, as shown, or alternatively molded or cast in the approximate form and finished by machining the final configuration. Another possibility is to stamp the frames out of a metal such as aluminum, again in the approximate form, and then also machining the frame into the final configuration as described herein.

Thus the disclosed structure achieves the objects of the invention in a simple but very effective manner.

I claim:

1. In combination
   a substantially rigid metal frame portion of a pair of spectacles including a pair of openings for receiving a pair of lenses therein;
   a pair of substantially flexible lenses having a forwardly extending convex curvature mounted in said lens openings, each of said lenses having a front and rear surface and an edge extending about its periphery;
   each of said lens receiving openings in said front frame including a lens receiving groove means which receives the edge of each of said lenses and extends completely around the periphery thereof;
   each of said groove means comprising a front ledge portion joined to a rear ledge portion and spaced therefrom to form a lens receiving groove therebetween, said front and rear ledge portions being integral with said substantially rigid metal frame portion;
   each of said front ledge portions extending inwardly from the edge of said lens mounted in each of said grooves and contacting a curved portion of the front surface of said lens spaced inwardly from the edge of said lens;
   each of said front ledge portions extending inwardly from the edge of said lens mounted in each of said grooves a substantially greater distance than said rear ledge portions, said rear ledge portions being positioned to contact at least a portion of the edge of the rear surfaces of each said lenses mounted in said grooves to aid in maintaining said lenses in said grooves; whereby, each of said lenses is insertible in its respective groove by flexing it to allow its edge to pass over said lesser inwardly extending rear ledge portion and into said groove, said further inwardly extending front ledge portion covering from view the outermost peripheral portion of each lens mounted in said groove.

2. The combination of claim 1 wherein said front ledge portion extends inwardly from the edge of each of said lens mounted in each of said grooves at least twice the distance that said rear ledge portion extends inwardly from the edge of each of said lenses.

3. The combination of claim 1 wherein the length of each of said front ledge portions as measured from the deepest part of each of said grooves along the lens facing wall of said front ledge portion is about 0.050 inches and said rear ledge portion as measured from the deepest part of the groove along the lens facing wall of said rear ledge portion is about 0.020 inches.

* * * * *